March 8, 1949.  E. A. J. WARSHYK ET AL  2,463,580

PROCESS FOR INCREASING DIAMETERS

Filed May 10, 1946

INVENTOR.
Edward A. J. Warshyk
Ferdinand Daniel
BY

ATTORNEY

UNITED STATES PATENT OFFICE 2,463,580

PROCESS FOR INCREASING DIAMETERS

Edward A. J. Warshyk, Brooklyn, and Ferdinand Daniel, Maspeth, N. Y.

Application May 10, 1946, Serial No. 668,990

2 Claims. (Cl. 29—148)

(Granted under the act of March 3, 1883, as amended April 30, 1928; 370 O. G. 757)

This invention relates to a processs for increasing the diameters of shafts.

Previous methods of accomplishing this intended result were slower and more expensive, inasmuch as they required welding, heat treating, and lathe machine work. The method herein described is fast and economical, requiring a minimum of special equipment and time.

An object of this invention is to provide a method for restoring worn shafts and other members to their original diameters.

Another object is to provide a method for increasing the diameters of shafts.

A further object is to gain useful material properties in a member by bringing a second material into an operative bond with the first.

Further objects and advantages of this invention will be apparent from the following description and claims in connection with the accompanying drawing, in which Fig. 1 is a front elevational view of a shaft in the initial groove-rolling stage, a portion being shown in vertical section;

Figs. 1, 2, 3, and 4 represent the results of successive steps of the process of this invention in which a shaft 10 is acted on by a roller 11 to form a helical groove 12 on the surface of shaft 10.

Figure 3:
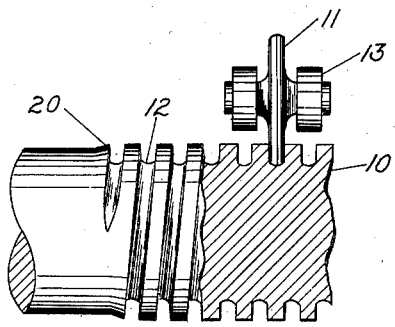
Fig. 3 is a front elevational view of a shaft in the final groove-rolling stage, a portion being shown in vertical section, and a portion of a forming roller.
Figure 4:
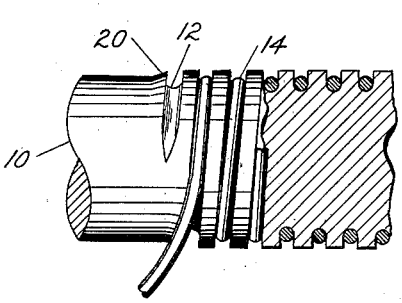
Fig. 4 is a front elevational view of the grooved shaft showing the step of winding wire in the grooves, a portion of the shaft being shown in vertical section for clarity.

During application of roller 11 in this process, the shaft 10 is supported and rotated between the centers of a lathe and the roller 11 is supported by a suitable member, the supporting bearing surfaces 13 of which are shown in Fig. 3, said member being adapted for attachment to the toolpost of the lathe. The lead screw of the lathe is operated to give a regulated advance to the toolpost for each revolution of the shaft 10, thereby causing the formation of a helical pattern for the groove 12. Said groove 12 is deepened gradually by each of multiple applications of the roller 11.

Figure 1:
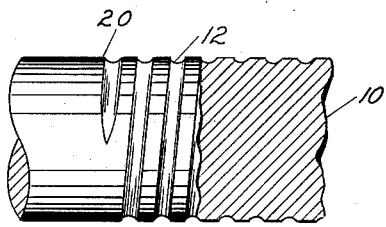
Figure 2:
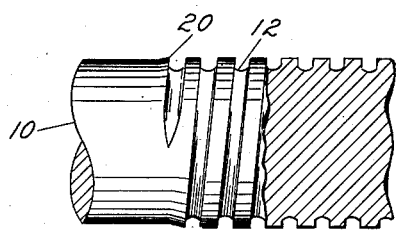
Fig. 2 is a front elevational view of a shaft in an intermediate groove-rolling stage, a portion being shown in vertical section.

Pieces grooved or upset by rolling as shown in Figs. 1, 2, and 3 have their diameters increased an amount proportionate to the depth of the rolled groove, as indicated at 20. For many purposes such an increase in diameter is satisfactory, and wherever the grooves are not disadvantageous, the shaft 10 as shown in Fig. 3 can be used.

If a smooth surface is desired for the shaft, a length of wire 14 is coiled about the shaft 10 in groove 12. The wire 14 is of such size and shape as necessary to conform to the lower surface of groove 12, filling about one half the volume of the recessed groove 12.

Figure 5:
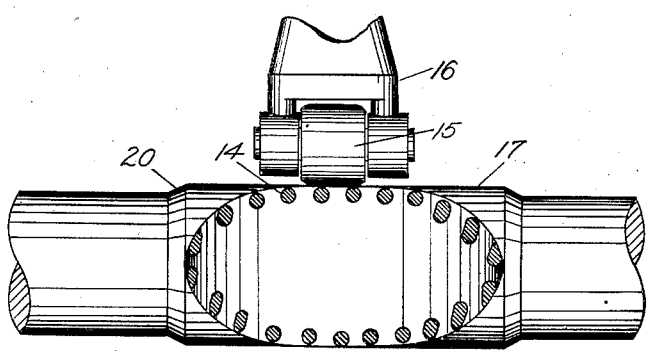
Fig. 5 is a front elevational view of the shaft with increased diameter, a portion being shown in vertical cross section, and showing a portion of a final pass roller.

When the wire is coiled tightly in the groove 12, a second tool supporting a finishing roller 15 is used to roll the top edges of groove 11 until the wire 14 is covered completely and the channel of groove 12 is closed to form a smooth surface 17, as shown in Fig. 5, where the finishing roller 15 is shown supported by the bearing surfaces 16 of a suitable member.

While the accompanying drawings indicate the use of one roller 11 to form the groove 12, a plurality of rollers can well be used to form the grooves as herein described. Practice has shown that for larger shaft pieces several rollers, each of the same or different design, accomplish the purpose in a more efficient and economical manner.

Various modifications and changes can be made in the subject device without departing from the scope of the invention.

The invention described herein may be manufactured and used by and for the Government of the United States of America for governmental purposes without the payment of any royalties thereon or therefor.

We claim:

1. The process of increasing the diameter of a malleable cylinder comprising forming a helical groove in a portion of the surface of said cylinder by a rolling operation which flows the material between the grooves outwardly to displace all of the outer surface of the material between the grooves beyond the original diameter of the cylinder, filling the groove partly with an added material, and forcing back into the groove part of the material displaced by said rolling operation without elongating the cylinder.

2. The process of increasing the diameter of a malleable cylinder comprising forming a helical groove in a portion of the surface of said cylinder by a series of successive rolling operations which flow the material between the grooves outwardly to displace all of the outer surface of the material between the grooves beyond the original diameter of the cylinder, filling the groove partly with an added material, and forcing back into the groove part of the material displaced by said series of rolling operations without elongating the cylinder.

EDWARD A. J. WARSHYK.
FERDINAND DANIEL.

REFERENCES CITED

The following references are of record in the file of this patent:

UNITED STATES PATENTS

| Number | Name | Date |
| --- | --- | --- |
| 1,617,122 | Kaufman | Feb. 8, 1927 |
| 2,375,068 | Bennett | May 1, 1945 |